United States Patent [19]

Okano

[11] Patent Number: 4,539,602
[45] Date of Patent: Sep. 3, 1985

[54] TIME AXIS CORRECTION DEVICE FOR MULTIPLEX INFORMATION-CARRYING SIGNAL OBTAINED FROM RECORDING MEDIUM

[75] Inventor: Takashi Okano, Tokorozawa, Japan

[73] Assignee: Pioneer Video Corporation, Tokyo, Japan

[21] Appl. No.: 392,128

[22] Filed: Jun. 25, 1982

[30] Foreign Application Priority Data

Jun. 30, 1981 [JP] Japan .................................. 56-102975

[51] Int. Cl.³ ............................................. H04N 5/91
[52] U.S. Cl. .................... 358/337; 358/343; 360/36.1; 360/19.1
[58] Field of Search ............................ 369/47, 48, 60; 358/337, 340, 343; 360/36.1, 36.2, 27, 8, 19.1, 28, 26

[56] References Cited

U.S. PATENT DOCUMENTS

| 3,580,991 | 5/1971 | Krouse | 360/26 |
| 3,748,386 | 7/1973 | Monney | 360/36.2 |
| 4,090,215 | 5/1978 | Buchan et al. | 358/325 |
| 4,228,460 | 10/1980 | Rotter | 360/36.1 |
| 4,297,728 | 10/1981 | Lowe | 360/36.1 |
| 4,385,327 | 5/1983 | Pate | 360/27 |

Primary Examiner—Alan Faber
Attorney, Agent, or Firm—Fleit, Jacobson, Cohn & Price

[57] ABSTRACT

A time axis correction device for a recording medium player such as a video disc player, which device corrects the time axis of at least one component signal of a plurality of component signals contained in a multiplex information-carrying signal which is picked up from a recording medium, in accordance with an error between a reference signal and a pilot signal separated from the multiplex information-carrying signal, so that the time axis correction operation is performed stably.

5 Claims, 4 Drawing Figures

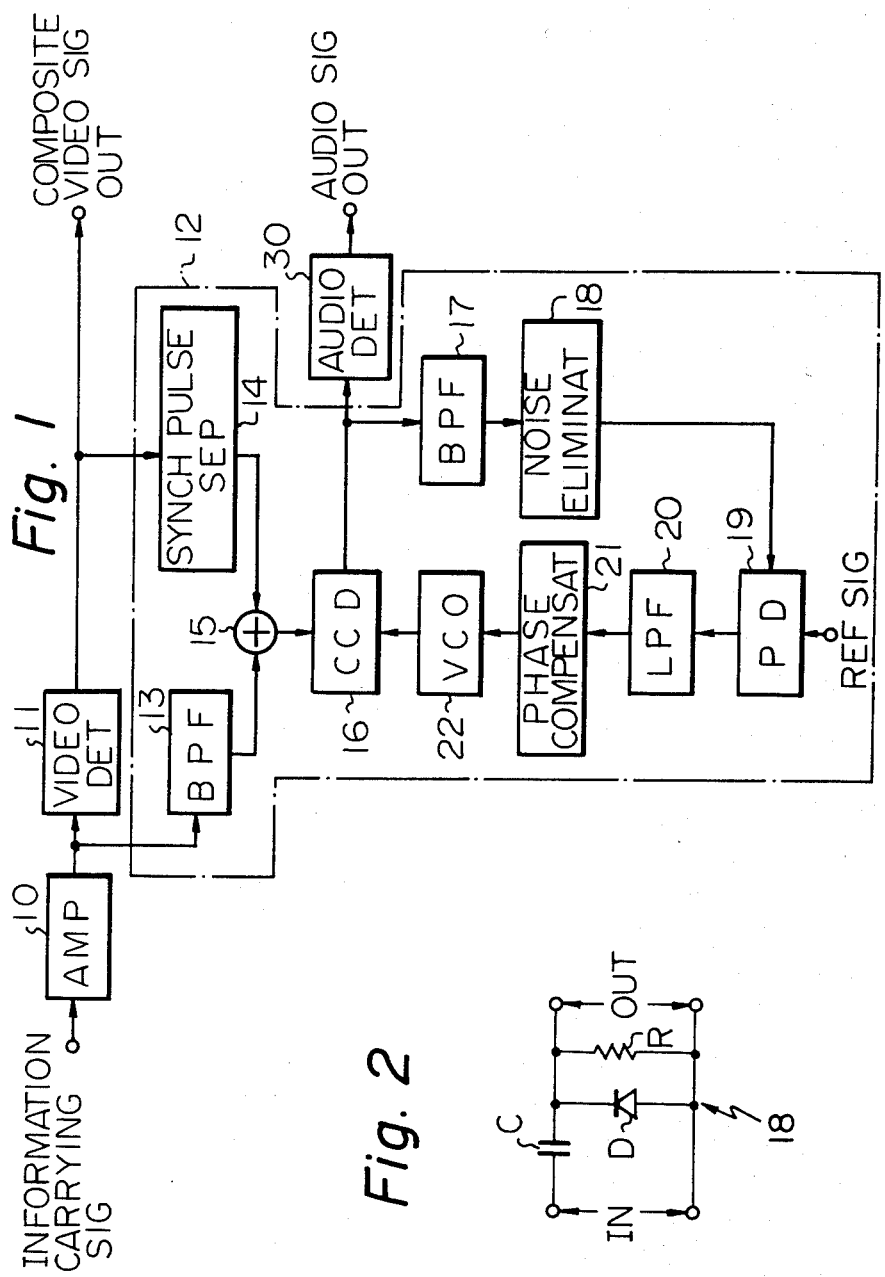

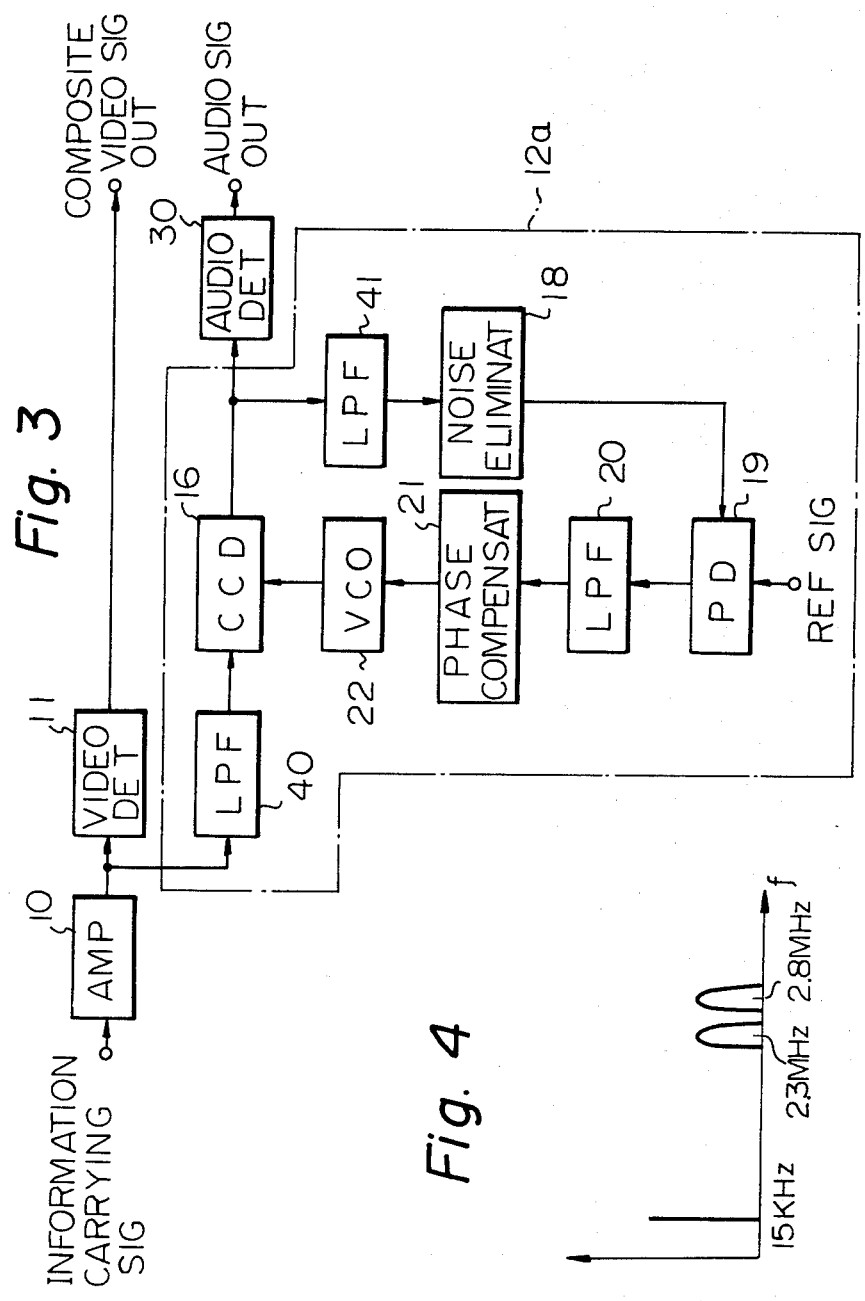

TIME AXIS CORRECTION DEVICE FOR MULTIPLEX INFORMATION-CARRYING SIGNAL OBTAINED FROM RECORDING MEDIUM

BACKGROUND OF THE INVENTION

1. Field of the Invention

The present invention relates to a recording medium player for reproducing a multiplex information-carrying signal which is obtained from a recording medium such as video disc and video magnetic tape and, in particular, to a time axis correction device for correcting or adjusting the time axis of a multiplex information-carrying signal obtained from a recording medium.

2. Description of the Prior Art

It is well known in the art that the time axis correction device is used in a recording medium player such as video disc player and video tape player so as to correct or adjust the time axis of an information-carrying signal obtained from a recording medium thereby to eliminate fluctuations in the time axis of the information-carrying signal due to fluctuations in the relative speed between the pick-up device and the recording medium. In many cases, the information-carrying signal contains a plurality of information-carrying component signals such as a video information-carrying component signal and an audio information-carrying component signal. The respective time axes of the information-carrying component signals are to be adjusted or corrected, respectively, by means of a time axis correction device.

In a prior art time axis correction device, the color burst signal contained in the video information-carrying signal is seperated and compared with a reference signal thereby to produce an error signal which is utilized for correcting or adjusting the time axes both of the video information-carrying signal and the audio information-carrying signal.

It has, however, been a problem that since the color burst signal is absent during the vertical blanking period of the video signal, the time axis correction operation for the audio information-carrying signal is interrupted at every vertical blanking period so that the demodulated audio information signal contains unwanted fluctuations in the time axis thereof. When, for example, the repetition frequency of the vertical blanking periods is 60 Hz, the demodulated audio information signal contains noises of 60 Hz. It is, on the other hand, to be noted that the video information signal is not adversely affected by such interruptions in the time axis correction operation, since no picture is reproduced during such blanking periods.

SUMMARY OF THE INVENTION

It is therefore a primary object of the present invention to provide an improved time axis correction device for performing time axis correction operation for at least one information-carrying component signal of a plurality of component signals contained in a multiplex information-carrying signal obtained from a recording medium.

According to the present invention, there is provided a time axis correction device which corrects the time axis of at least one component signal of a plurality of component signals contained in a multiplex information-carrying signal read from a recording medium, the information-carrying signal further containing a pilot signal, which comprises a first separating means for separating the one component signal and the pilot signal from the information-carrying signal; delay means for applying a delay to the pilot signal and the one component signal, the delay being regulated in accordance with a control signal; second separating means for separating the pilot signal from the delayed signals; error detecting means for detecting an amount of error in the time axis between a reference signal and the separated pilot signal from the delayed signals; and control means for producing said control signal representative of the amount of error.

BRIEF DESCRIPTION OF THE DRAWINGS

The above-mentioned object and advantages of the invention will become apparent from the description taken in conjunction with the accompanying drawings, in which:

FIG. 1 is a block diagram of an embodiment of the present invention;

FIG. 2 is a circuit diagram showing a circuit arrangement of a part of the device shown in FIG. 1;

FIG. 3 is a block diagram showing another embodiment of the present invention; and FIG. 4 is a frequency spectrum of audio information-carrying signal and a pilot signal.

DETAILED DESCRIPTION OF THE EMBODIMENTS

Referring now to FIG. 1, there is shown a time axis correction device according to the present invention which is incorporated in a recording medium player such as a video disc player. In the case of a video disc player, a multiplex information-carrying signal is read from a video disc mounted on a turn-table and rotated at a certain speed by means of a pick-up device (not shown). Being well known in the art, the multiplex information-carrying signal contains a video information-carrying signal and an audio information-carrying signal which are, for example, frequency-modulated and multiplexed with each other. The thus read multiplex information-carrying signal is applied through an amplifier 10 to a video detector 11 and to a time axis correction device 12 of the present invention. The video detector 11 includes a band-pass filter (not shown) for receiving only the video information-carrying component signal and a demodulator (not shown) for demodulating the video information-carrying signal into a composite video signal. The video detector 11 may contain a time axis correction device (not shown) for correcting the time axis of the video information-carrying signal.

The time axis correction device 12 includes a band-pass filter 13 (first separating means) for passing therethrough only the audio information-carrying component signal and a synchronous pulse separator 14 of a band-pass filter for passing therethrough only the standard horizontal synchronous pulse signal contained in the composite video signal. The video detector 11 and the synchronous pulse separator 14 are sometimes referred to as the second separating means. The audio information-carrying component signal and the synchronous pulse signal are added to each other by means of an adder 15. The added signals are supplied to an input terminal of a delay circuit 16 such as CCD (Charge Coupled Device) which applies to the input signal thereof a delay regulated in accordance with a control signal applied to its control terminal. The thus delayed synchronous pulse signal produced from the delay circuit 16 is separated from the delayed audio information-carrying signal by means of a band-pass filter 17 (third separating means). The delayed synchronous pulse signal passed through the band-pass filter 17 is then applied through a noise eliminator 18 to one input terminal of a phase detector 19 (the error detecting means). The noise eliminator 18 is adapted to eliminate drive noises in the delayed synchronous pulse signal produced in the delay circuit 16. It is now to be noted that the drive noises mentioned above means variations in the output voltage of the delay circuit caused by variations of the delay time.

To the other input terminal of the phase detector 19 is applied a reference signal having predetermined constant frequency and phase. The phase detector 19 produces an output voltage representative of difference in phase between the delayed synchronous pulse signal and the reference signal. The output voltage of the phase detector 19 is applied through a low-pass filter 20 and a phase compensating circuit 21 to a control input terminal of a VCO (Voltage-Controlled Oscillator) 22 which produces a frequency signal having a frequency varying in accordance with the input voltage applied to the control input terminal thereof. The frequency is supplied to the control terminal of the delay circuit 16 as the control signal. In this embodiment, the control signal is a clock pulse signal for the CCD of the delay circuit 16.

It is now to be understood that the horizontal synchronous pulse signal contained in the video composite signal is exploited as the pilot signal for obtaining the error signal representative of the time axis fluctuations in the audio information carrying signal.

The delayed audio information carrying signal from the delay circuit 16 is applied to an audio detecting circuit 30 which demodulates the audio information-carrying signal applied thereto into the original audio information signal. The audio information signal may be not only monaural but also binaural. Furthermore, the audio information may consist of two channel signals representative of two different programs.

FIG. 2 shows a circuit arrangement of the noise eliminator 18, which is a kind of high-pass filter. The high-pass filter passes therethrough only a positive component of a high-frequency.

FIG. 3 shows another time axis correction device according to the present invention, which is incorporated in a recording medium player in a manner similar to the time axis correction device shown in FIG. 1. As being similar to the system of FIG. 1, a multiplex information signal obtained from a recording medium such as a video disc is supplied to an amplifier 10. It is however to be noted that the multiplex information signal includes a pilot signal of a constant frequency of, for example, 15 KHz and a pair of audio information carrier signals respectively carrying thereon two channels of audio information. The audio information carrier signals have different frequency of, for example, 2.3 MHz and 2.8 MHz which are respectively modulated in frequency. The frequency spectrum of the multiplex information-carrying signal is shown in FIG. 4. In this instance, it is to be noted that the multiplex information-carrying signal further contains a video information carrier signal carrying thereon video information and having a higher frequency than 2.8 MHz so that the video information carrier signal is not shown in FIG. 4.

The multiplex information-carrying signal containing such component signals mentioned above is applied to a video detector 11 and to a time axis correction device 12a according to the present invention. The video detector 11 has the same construction as the video detector 11 of the apparatus shown in FIG. 1. The time axis correction device 12a has the same construction as that of the time axis correction device 12 of FIG. 1 except that a low-pass filters 40 and 41 are used which correspond to the band-pass filters 13 and 17. The low-pass filter 40 separates the pilot signal of 15 KHz and audio information carrier signals of 2.3 MHz and 2.8 MHz from the video information carrier signal, so that the separated pilot signal and audio information carrier signals are supplied to a delay circuit 16. The low-pass filter 41 is adapted to separate only the delayed pilot signal which is then supplied to a noise eliminator 18.

Being apparent from the above description, the time axis correction device corrects or adjusts the time axis of the audio carrier component signal in independent from the time axis correction for video carrier component signal, so that the time axis correction operation is much stable whereby the demodulated audio information is free from unwanted noises. Furthermore, the time axis correction device according to the present invention includes a closed servo loop circuit for performing its time axis correction operation, so that the device can operate stably.

It is to be understood that the delay circuit may be constituted by a BBD (Bucket Brigade Device) etc.

It will be understood that the invention is not to be limited to the exact construction shown and described and that various changes and modifications may be made without departing from the spirit and scope of the invention, as defined in the appended claims.

What is claimed is:

1. A time axis correction device which corrects the time axis of an audio information-carrying component signal contained in a multiplex information-carrying signal which is read from a recording medium and further contains video information-carrying component signal with the standard horizontal synchronous pulse signal, which includes first separating means for separating said audio information-carrying component signal from said multiplex information-carrying signal, second separating means for separating said video information-carrying component signal from said multiplex information signal and for further separating said standard horizontal synchronous pulse signal from said video information-carrying signal, the time axis/correction device comprising:
   an adder for adding said audio information-carrying signal and said standard synchronous pulse signal;
   variable delay means for applying a delay to the added audio information-carrying and standard horizontal synchronous pulse signals, said delay being varied in accordance with a control signal;
   third separating means for separating the horizontal synchronous pulse signal from the added and delayed signals;
   error detecting means for detecting an amount of error in the time axis between a predetermined reference signal and the horizontal synchronous pulse signal from said third separating means; and
   control means for producing said control signal representative of the amount of error.

2. A time axis correction device as set forth in claim 1, in which said variable delay means is a charge coupled device.

3. A time axis correction device as set forth in claim 2, in which said error detecting means is a phase detector for producing a voltage proportional to difference in phase between the predetermined reference signal and the horizontal synchronous pulse signal from said third separating means.

4. A time axis correction device as set forth in claim 3, in which said control means includes a low pass filter for passing therethrough the voltage from said phase detector while eliminating high frequency components contained in the voltage from said phase detector, and a voltage controlled oscillating means for producing a frequency signal having a frequency varying in accordance with the voltage from said phase detector.

5. A time axis correction device as set forth in claim 1, in which said third separating means includes a band pass filter for passing therethrough the horizontal synchronous pulse signal and a noise eliminator for passing therethrough the horizontal synchronous pulse signal from said band pass filter while eliminating noises contained in the horizontal synchronous pulse signal.

* * * * *